United States Patent [19]

Fujine

[11] Patent Number: 5,232,181
[45] Date of Patent: Aug. 3, 1993

[54] SPINNING REEL FOR FISHING

[75] Inventor: Osamu Fujine, Saitama, Japan

[73] Assignee: Olympic Co., Ltd., Saitama, Japan

[21] Appl. No.: 705,369

[22] Filed: May 24, 1991

[51] Int. Cl.⁵ .............................................. A01K 89/01
[52] U.S. Cl. ..................................... 242/241; 242/279
[58] Field of Search ................. 242/231, 232, 241, 279

[56] References Cited

U.S. PATENT DOCUMENTS

| | | | |
|---|---|---|---|
| 3,425,643 | 2/1969 | Lemon | 242/241 |
| 4,512,531 | 4/1985 | Tunoda | 242/241 |
| 4,618,107 | 10/1986 | Nakajima | 242/241 |
| 4,773,611 | 9/1988 | Kaneko | 242/241 |
| 4,865,262 | 9/1989 | Tsunoda | 242/241 |
| 4,874,140 | 10/1989 | Hitomi | 242/241 X |

FOREIGN PATENT DOCUMENTS

| | | | |
|---|---|---|---|
| 210282 | 9/1957 | Australia | 242/241 |
| 56-141080 | 10/1981 | Japan . | |
| 351820 | 7/1931 | United Kingdom | 242/241 |

Primary Examiner—Daniel P. Stodola
Assistant Examiner—Michael R. Mansen
Attorney, Agent, or Firm—Sandler, Greenblum & Bernstein

[57] ABSTRACT

A spinning reel wherein a flyer is rotated by the rotation of a handle and a spool reciprocates back and forth. The reciprocating motion of the spool is decelerated by means of a reduction gearing relative to the rotation of the flyer which is rotated by the handle, to narrow a cross winding pitch of the fishing line wound round the outer peripheral surface of the spool.

1 Claim, 3 Drawing Sheets

SPINNING REEL FOR FISHING

BACKGROUND OF THE INVENTION

1. Field of the Invention

The present invention relates to a spinning reel for fishing and more particularly to a driving mechanism (parallel winding mechanism) for a spool which reciprocates back and forth relative to a rotating flyer.

2. Description of the Prior Art

In a spinning type fishing reel, a flyer rotated by the rotation of a handle and at the same time a spool is reciprocated back and forth, allowing a fishing line to be wound round the outer periphery of the spool through a line roller attached to the rotating flyer.

As a reciprocating structure of a spool which reciprocates back and forth relative to a rotating flyer there is proposed one comprising a rotary shaft formed with a traverse cam groove and an engaging piece in Japanese Utility Model Laid Open No. 141080/1981. In this reciprocating structure, a small gear integral with the rotary shaft is in mesh with a pinion gear which is in mesh with a driving gear. However, since the gear ratio of the driving gear and the pinion gear is three to five revolutions per revolution of the driving gear, the number of revolutions of the rotary shaft driven through the small gear which is in mesh with the pinion gear rotating at high speed is also high, resulting in that the reciprocating speed of the spool shaft is high and the cross winding pitch of the fishing line wound round the outer peripheral surface of the spool becomes rough. Therefore, in the case where the spinning reel is only for casting, wherein the line winding portion of the spool is shallow, the quantity of line wound thereon is small, making it impossible to wind a required length of fishing line thereon.

SUMMARY OF THE INVENTION

The present invention has been accomplished in view of the above-mentioned drawback of the prior art and it is the object of the invention to provide a spinning reel for fishing capable of surely winding a predetermined length of fishing line even if the line winding portion of a spool is shallow.

According to the spinning reel for fishing of the present invention, a spur gear portion is formed on a radial outer peripheral surface of a main gear with a face gear portion formed on the back side which is in mesh with a pinion gear; a parallel winding gear (B) comprising a helical gear is fixedly fitted for integral rotation on one side of a rotary shaft of a parallel winding gear (A) which is in mesh at the other end thereof with the spur gear portion, the parallel winding gear (B) being in mesh with a helical gear formed on one side portion of a lease groove shaft which is supported in parallel with a reel shaft; and a slider case which incorporates therein a slider engaged with the lease groove shaft is connected and fixed to the rear portion of the reel shaft.

The mounting of the parallel winding gears (A) and (B) for the above rotary shaft is not specially limited if only it permits integral rotation. For example, it may be carried out by press-fitting or by a non-circular fitting structure such as an oval- or square-shaped structure.

The intermeshing of the parallel winding gear (B) comprising a helical gear and the helical gear of the lease groove shaft affords a decelerative structure wherein the longitudinal reciprocating speed of the reel shaft is low relative to the rotation of the flyer.

According to the above construction, the rotating force is transmitted to the flyer through the route of face gear portion of the main gear→pinion gear, and the longitudinal reciprocating motion of the spool is transmitted like the spur gear portion of the main gear→parallel winding gear (A)→rotary shaft→parallel winding gear (B) of the helical gear→helical gear→slider→reel shaft. The longitudinal reciprocating motion of the reel shaft is decelerated by the intermeshing of the parallel winding gear (B) and the helical gear. Thus, since the longitudinal reciprocating speed of the reel shaft relative to the rotation of the flyer is low, the cross winding pitch of the fishing line wound round the spool is narrow.

According to the above construction of the fishing spinning reel of the present invention, the rotating force is decelerated from the spur gear portion of the main gear to the lease groove shaft through the parallel winding gear (A) and the parallel winding gear (B) comprising a helical gear, with the result that the reciprocating speed of the spool is low relative to the rotation of the flyer and hence the cross winding pitch of the fishing line wound round the spool becomes narrow.

Consequently, the fishing line can be wound densely round the spool, whereby a required length of fishing line can be surely wound round even a reel spool having a shallow line winding portion. Thus, it is possible to provide a spinning reel for fishing of high utility.

BRIEF DESCRIPTION OF THE DRAWINGS

The drawings illustrate an embodiment of the present invention, in which.

DETAILED DESCRIPTION OF A PREFERRED EMBODIMENT

Figure 1:
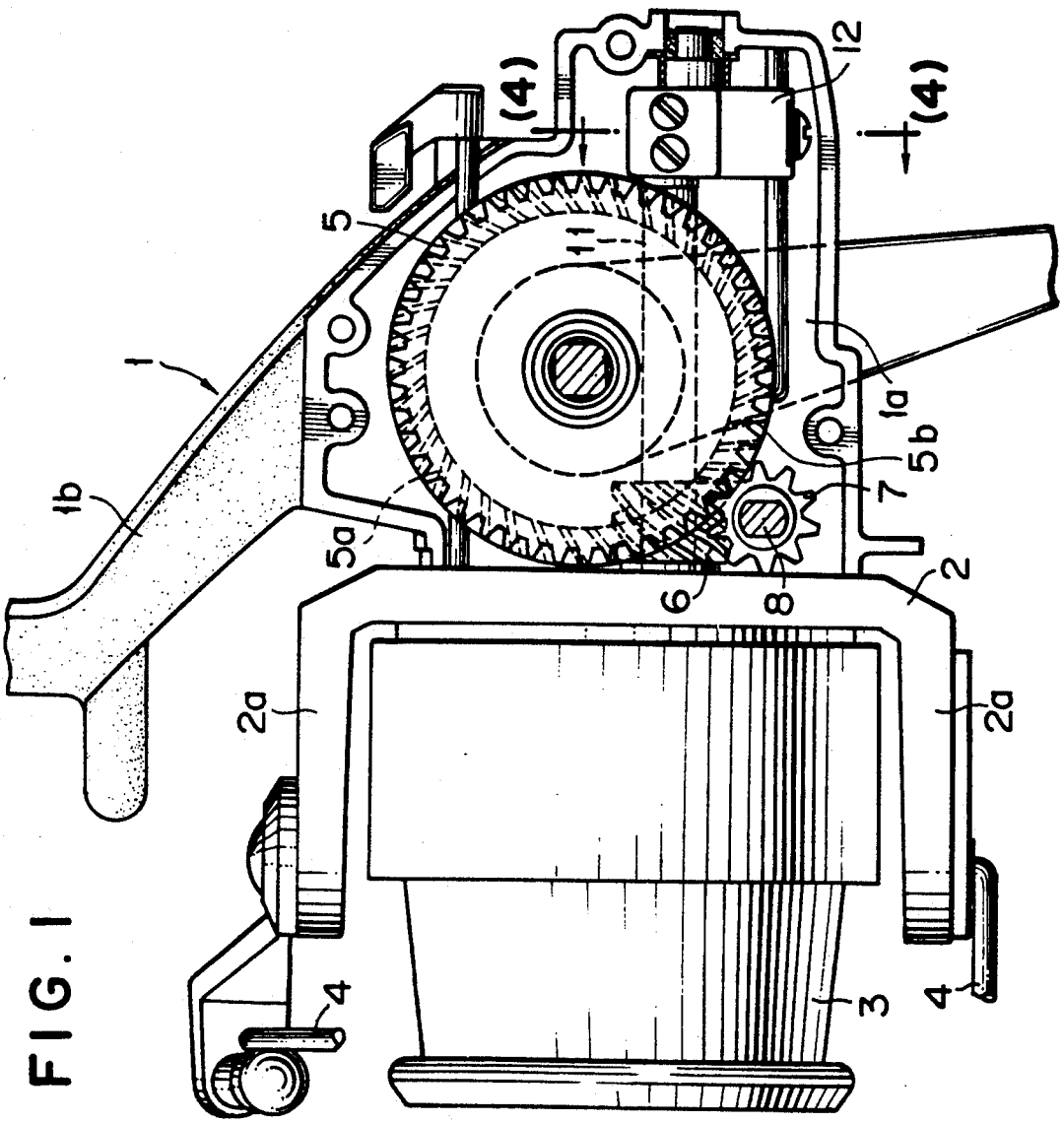
FIG. 1 is a front view with a gear case being cut-away.
Figure 2:
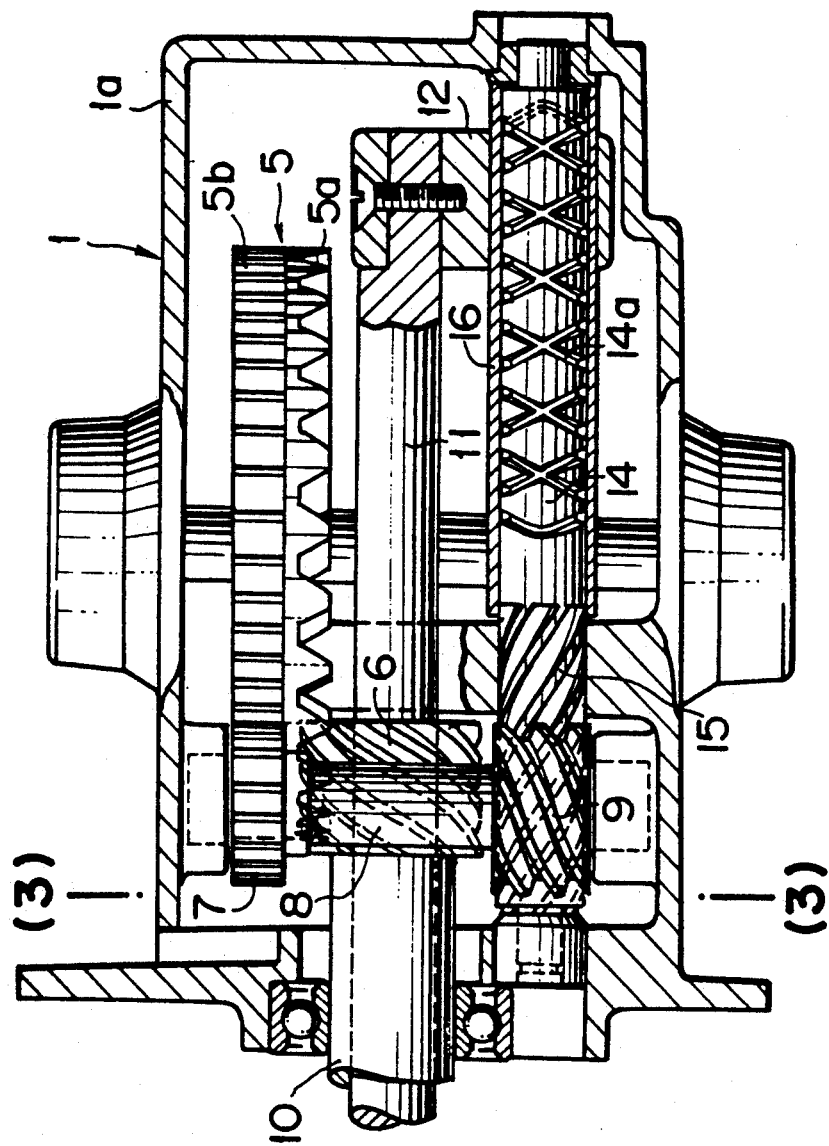
FIG. 2 is a partially cut-away, enlarged bottom view of a principal portion.
Figure 3:
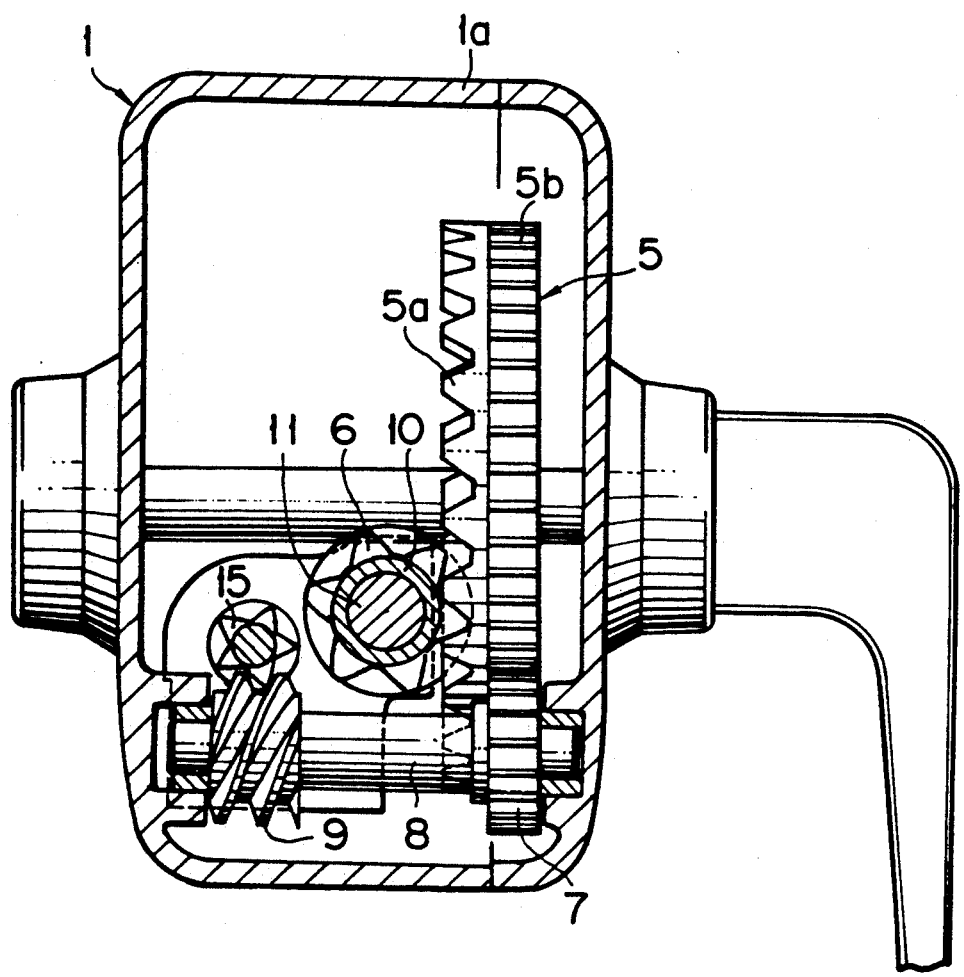
FIG. 3 is a sectional view taken along line (3)—(3) in FIG. 2.
Figure 4:
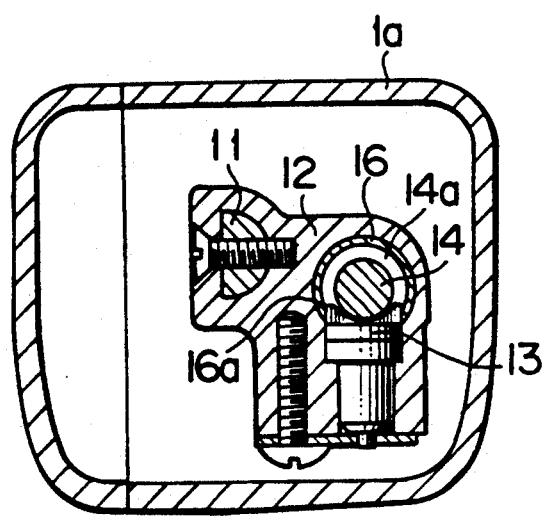
FIG. 4 is a sectional view taken along line (4)—(4) in FIG. 1.

An embodiment of the present invention will be described in detail hereinunder with reference to the accompanying drawings.

A spinning reel for fishing embodying the invention comprises a reel body 1 comprising a gear case 1a which accommodates a driving mechanism therein and a reel leg 1b; a flyer 2 adapted to rotate in front of the reel body 1; and a spool which slides reciprocatively in the longitudinal direction with respect to the flyer 2. And a bail 4 spans opposed arm portions 2a of the flyer 2.

The driving mechanism accommodated in the gear case 1a of the reel body 1 comprises a main gear 5 which is rotated by the rotation of a handle; a pinion gear 6 which is in mesh with a face gear portion 5a engraved on the back side of the main gear 5; a parallel winding gear (A) 7 which is in mesh with a spur gear portion 5b formed on the outer peripheral surface of the main gear 5; and a parallel winding gear (B) 9 comprising a helical gear and fixed to a side portion of a rotary shaft 8 of the parallel winding gear (A) 7. A handle shaft is fitted and retained for integral rotation in an interior square hole of a shaft cylinder.

The pinion gear 6 meshing with the face gear portion 5a of the main gear 5 is formed on a pinion shaft 10, and the flyer 2 is integrally fixed to the pinion shaft 10 by tightening of a nut. Further, a reel shaft 11 is inserted through the pinion shaft 10, and the spool 3 is mounted to the front end of the reel shaft 11, while to the rear portion of the reel shaft 11 is screwed a slider case 12 in a swivel-stop fashion, with a slider 13 being accommodated in the slider case 12. The slider 13 is engaged with a lease groove 14a of a lease shaft 14 mounted in parallel with the reel shaft 11. One side portion of the lease groove shaft 14 is formed with a transfer gear 15 of a helical gear, which is in mesh with the parallel winding gear (B) 9. A guide cover 16 fitted over the outer peripheral surface of the shaft portion where the lease groove 14a is formed, and a front portion of the slider 13 is fitted in the lease groove 14a through an opening 16a formed in the circumferential wall of the guide cover 16.

In the above construction, when the handle is rotated, the rotating force is transmitted by the face gear portion 5a of the main gear 5 to pinion gear 6 (pinion shaft) to rotate the flyer 2. At the same time, the rotating force is transmitted by the spur gear portion 5b of the main gear 5→parallel winding gear (A) 7→rotary shaft 8→parallel winding gear (B) 9→transfer gear 15, so that the lease groove shaft 14 rotates in a decelerative manner. Further, the reel shaft 11 is reciprocated back and forth by the operation of the slider 13 which is in mesh with the lease groove 14a of the lease groove shaft 14, thus causing the spool 3 to reciprocate.

Since the reciprocating motion of the spool 3 is decelerated, the cross winding pitch of the fishing line wound round the spool 3 is narrow.

What is claimed is:

1. A spinning reel for fishing including a flyer to be rotated by rotation of a handle, a reel shaft forming an axis of said flyer, a spool mounted on a top end of said reel shaft to be reciprocated, said spinning reel comprising:

a main gear mounted for rotation by the rotation of said handle;

a spur gear mounted on an outer peripheral surface of said main gear;

a face gear provided at a peripheral edge of the plane of said main gear;

a pinion gear meshing with said face gear of said main gear so as to be rotated upon rotation of said main gear, said pinion gear being connected to said flyer, whereby said flyer is rotated upon rotation of said pinion gear;

a first parallel winding gear meshing with said spur gear of said main gear, said first parallel winding gear being fixedly mounted at one end portion of a rotary shaft;

a second parallel winding gear fixedly mounted at the other end portion of said rotary shaft to be opposed to and rotate together with said first parallel winding gear;

said second parallel winding gear meshing with a helical gear;

a lease groove shaft mounted in parallel with a reel shaft;

said helical gear being fixedly mounted at one end portion of said lease groove shaft;

a slider being housed in a slider case, said slider engaging said lease groove shaft, whereby said slider is reciprocated by rotation of said lease groove shaft; and said slider case being connected with the rear portion of said reel shaft.

* * * * *